(12) United States Patent
Nandi et al.

(10) Patent No.: US 11,922,106 B2
(45) Date of Patent: Mar. 5, 2024

(54) MEMORY EFFICIENT SCALABLE DISTRIBUTED STATIC TIMING ANALYSIS USING STRUCTURE BASED SELF-ALIGNED PARALLEL PARTITIONING

(71) Applicant: Synopsys, Inc., Sunnyvale, CA (US)

(72) Inventors: Abhishek Nandi, Sunnyvale, CA (US); Qiuyang Wu, Portland, OR (US); Yogesh Dilip Save, Bengaluru (IN)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 17/383,869

(22) Filed: Jul. 23, 2021

(65) Prior Publication Data
US 2022/0027542 A1    Jan. 27, 2022

Related U.S. Application Data

(60) Provisional application No. 63/056,112, filed on Jul. 24, 2020.

(51) Int. Cl.
| | |
|---|---|
| *G06F 30/327* | (2020.01) |
| *G06F 1/04* | (2006.01) |
| *G06F 30/3315* | (2020.01) |
| *G06F 119/12* | (2020.01) |
| *G06F 111/04* | (2020.01) |

(52) U.S. Cl.
CPC ......... *G06F 30/3315* (2020.01); *G06F 1/04* (2013.01); *G06F 30/327* (2020.01); *G06F 2111/04* (2020.01); *G06F 2119/12* (2020.01)

(58) Field of Classification Search
USPC ........................................ 716/105
See application file for complete search history.

(56) References Cited

U.S. PATENT DOCUMENTS

| | | |
|---|---|---|
| 6,557,151 B1 | 4/2003 | Donath et al. |
| 8,261,220 B2 | 9/2012 | Wu et al. |
| 2011/0131540 A1* | 6/2011 | Wu ............... G06F 30/3312 716/108 |

* cited by examiner

*Primary Examiner* — Bryce M Aisaka
(74) *Attorney, Agent, or Firm* — Lewis Roca Rothgerber Christie LLP

(57) ABSTRACT

A method includes extracting information associated with constraints and clock information from a file of a circuit design; determining a topological cone based on the extracted information for a partition of two or more partitions of the circuit design, and performing timing analysis on the partition of the two or more partitions based on the topological cone. The topological cone includes objects associated with the partition of the two or more partitions of the circuit design.

21 Claims, 12 Drawing Sheets

_US 11,922,106 B2_

MEMORY EFFICIENT SCALABLE DISTRIBUTED STATIC TIMING ANALYSIS USING STRUCTURE BASED SELF-ALIGNED PARALLEL PARTITIONING

CROSS-REFERENCE TO RELATED APPLICATIONS

The present application claims the benefit under 35 U.S.C. § 119(e) of U.S. Provisional Patent Application No. 63/056,112 filed on Jul. 24, 2020, which is incorporated herein by reference in its entirety for all purposes.

TECHNICAL FIELD

The present disclosure relates to distributed static timing analysis. In particular, the present disclosure relates to memory efficient scalable distributed static timing analysis using structure based self-aligned parallel partitioning.

BACKGROUND

Static timing analysis (STA) is a method of estimating the expected timing of a circuit without performing simulation. In STA, timing analysis can be carried out in an input-independent manner to determine the worst-case delay of the circuits in the design over all possible input combinations. A user may not proceed with subsequent steps in a design flow unless STA results are as desired. With ever increasing complexity and size of integrated circuits, performing STA on the design is both time consuming and resource intensive. For example, with large artificial intelligence (AI) chips having billions of logic gates, it could take days and servers with huge amount of physical memory to complete the STA. Therefore, in many cases, STA tools can increasingly become a major bottleneck for the design flow.

SUMMARY

In one aspect, a method for static timing analysis is provided. The method includes extracting information associated with constraints and clock information from a file of a circuit design, determining a topological cone based on the extracted information for a partition of two or more partitions of the circuit design, and perform timing analysis on the partition of the two or more partitions based on the topological cone. The topological cone includes objects associated with the partition of the two or more partitions of the circuit design.

In one aspect, a system for static timing analysis is provided. The system includes a memory storing instructions; and a processor, coupled with the memory and to execute the instructions. The instructions when executed cause the processor to extract information associated with constraints and clock information from a file of a circuit design, determine a topological cone based on the extracted information for a partition of two or more partitions of the circuit design, and perform timing analysis on the partition of the two or more partitions based on the topological cone. The topological cone includes objects associated with the partition of the two or more partitions of the circuit design.

In one aspect, a method for static timing analysis is provided. The method includes accessing at least one file of a circuit design, partitioning the circuit design into two or more partitions, sharing partial partition information associated with the two or more partitions with at least another computer processor, and receiving core timing update data associated with each partition of the two or more partitions.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to memory efficient scalable distributed static timing analysis (STA) using structure based self-aligned parallel partitioning. STA is one of the key steps of chip design flow.

Fitting a whole design into a single machine for STA may become challenging. As a workaround, many customers make hard tradeoff and take a risky route of performing STA in only one part of the design on a single machine and then on a separate run on another part. Using this recursive technique, the STA of the design can be run without exceeding the memory capacity of the single machine. Otherwise the memory requirement of a full flat STA is so high that very large machines are needed to run the STA. However, this kind of flow is very risky as it could miss some critical paths resulting in chip failure. In addition, the number of iterations of STA increases to cover the whole design which further affects the turnaround time negatively. The systems and methods described herein partition a circuit design into two or more partitions. Each partition may be run in parallel on a separate machine or resource. Described herein are approaches to solve slower runtime, larger resource requirement, and avoiding risky convoluted customer STA flows. Other STA flows that do not involve full flat design (e.g., HyperScale analysis) can also benefit from the approaches described herein. The systems and methods described herein have a faster runtime and a smaller memory footprint for timing analysis by partitioning a circuit design and thereafter running each partition in parallel on multiple resources.

Figure 1:
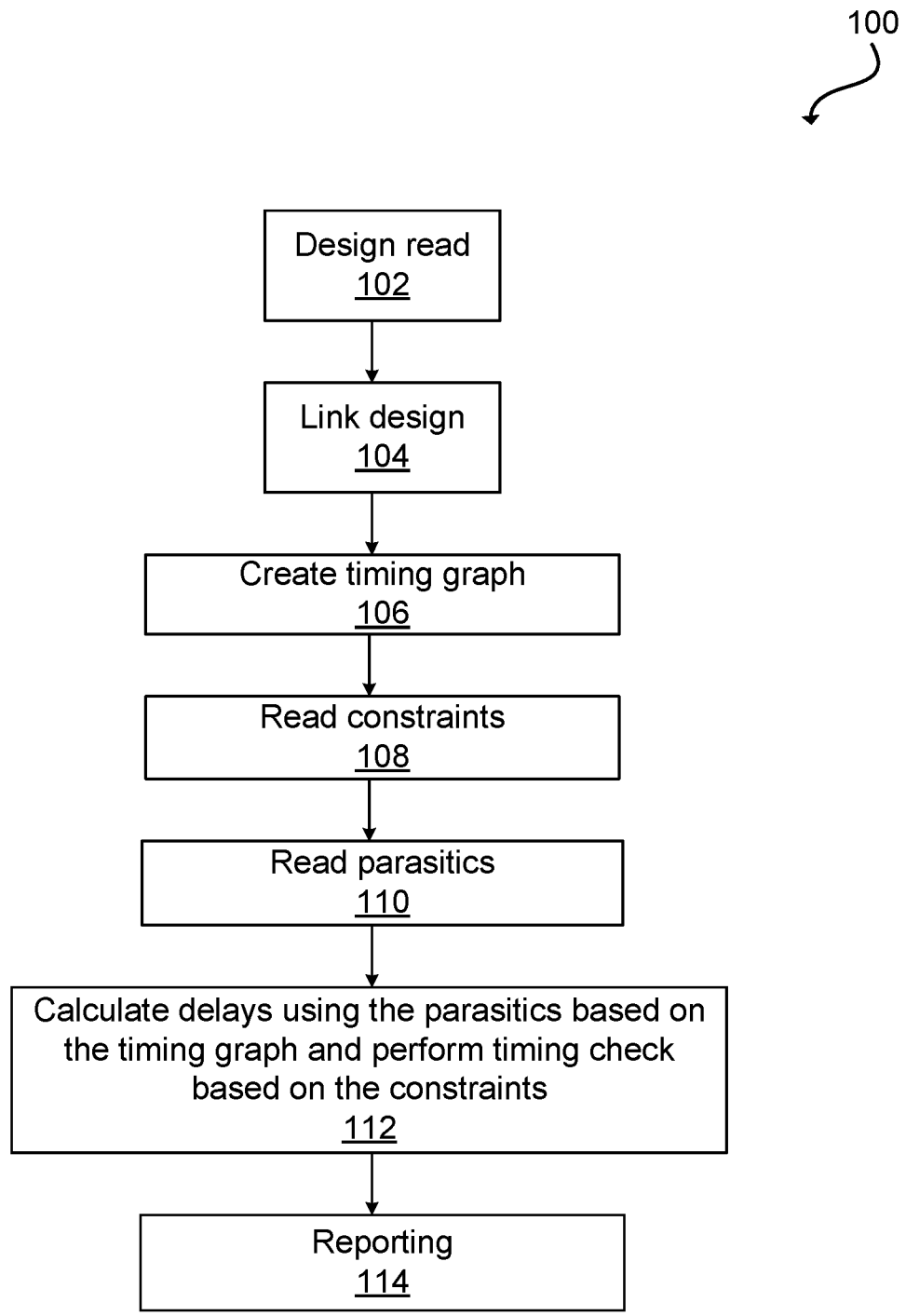
FIG. 1 illustrates a process for static timing analysis (STA) in accordance with an embodiment of the present disclosure.

FIG. 1 illustrates a process for static timing analysis in accordance with an embodiment of the present disclosure. At 102 of a process 100, the design is read mostly in the form of a hardware description language (HDL) (e.g., Verilog or very high-speed integrated circuit hardware description language (VHDL) files). At 104, the design is linked with technology libraries (hereby called linking). At 106, an early timing graph representation of the design linked with technology libraries is created. For example, the timing graph representation may be a visual representation of a directed graph that includes the cells and how the information flows through the cells. At 108, various STA constraints are received (e.g., read in, acquired). STA constraints are read either from SDC (Synopsys Design Constraints) or from a TCL file containing timing constraint commands. For example, timing constraints such as clocks descriptions and timing exceptions are read in. At 110, physical information (e.g., sizes, shapes, pin locations of the cells) are fed from parasitic files. For example, parasitics information are read from a parasitic file and then annotated into the nets of the circuit design. The parasitics file may include a network of resistances and capacitances for each net. The parasitic information may be used to compute cell delays and net delays. At 112, delays for all circuit elements are determined using the parasitics information (read at 110) by propagating them in the timing graph that is created at 106 and checking if timing is met against the constraints that are read in 108. At 114, various reporting commands are provided to the user. The reporting includes information regarding timing of the design. For example, the information may include timing paths of the design for all or a sub-set of the nets, pins, and cells.

The approaches described herein partitions the full flat design into multiple overlapping partitions (i.e., a portion of the circuit design may be included in two or more partitions) based on the structure of the design very early in the STA flow such that most of the analysis steps are fully distributed and parallel.

Partitioning is performed very early in the flow, even before flattening and elaboration of the full design. Partitioning is structure based and parallel with scanning timing constraints. A timing path is never broken because of partitioning. The timing path is kept in its entirety in a single worker machine. Design partitioning is an overhead function because it introduces an additional step in the STA flow. Design partitioning usually does not exist in a typical STA flow (e.g., process 100 shown in FIG. 1). There are multiple methods that may be used to deliver high quality partitioning with minimal overhead to the analysis flow.

In one implementation, the STA may be handled by a primary machine (master) and N worker machines (also referred to herein as workers or partitioners) for N partitions. The number of worker machines (thus the number of partitions) may be based on user specifications, computing resource availability, or the like as would be understood by one of ordinary skill in the art. The primary machine can have one or more configurations. The primary machine can be configured as per the resource configuration. In one implementation, the primary machine may be configured to use less memory. In other implementations, the primary machine can have enough information to perform basic STA reporting commands locally and thus making some reporting queries local to the primary machine. Once partitioning is done, STA can be performed in parallel on the worker machines with minimal communication between the worker machines. After updating timing for the full design, results can either be merged from multiple worker machines or obtained separately from each worker machine. For example, if timing slack of a pin is queried which is present in multiple partitions then data is collected from all those partitions and the most pessimistic value is reported back after merging the data. Early partitioning causes most of the STA flow to work on a reduced design. Thus, a faster STA completion time is achieved as the runtime of STA is proportional to a size of the circuit design.

In some embodiments, objects can appear in multiple partitions. A global identification (id) space may be used to uniquely identify each object. Shared objects with different local identifications in different partitions have the same global id. Also, every object has a primary partition responsible for its timing data. In one implementation, object space is sorted based on names to create the global id. Other sorting methods may be used to create the global id.

The approaches described herein also reduces peak memory requirement for STA of large designs significantly because of smaller worker machines and a lightweight primary machine. This enables efficient cloud-based computing. In addition, customers may run full flat STA on super large billion gates design without employing risky iterative STA flows. Further, runtime and memory benefits are scalable with number of partitions. Increasing the number of partitions reduces individual partition size and thus improving the runtime and memory.

Figure 2A:
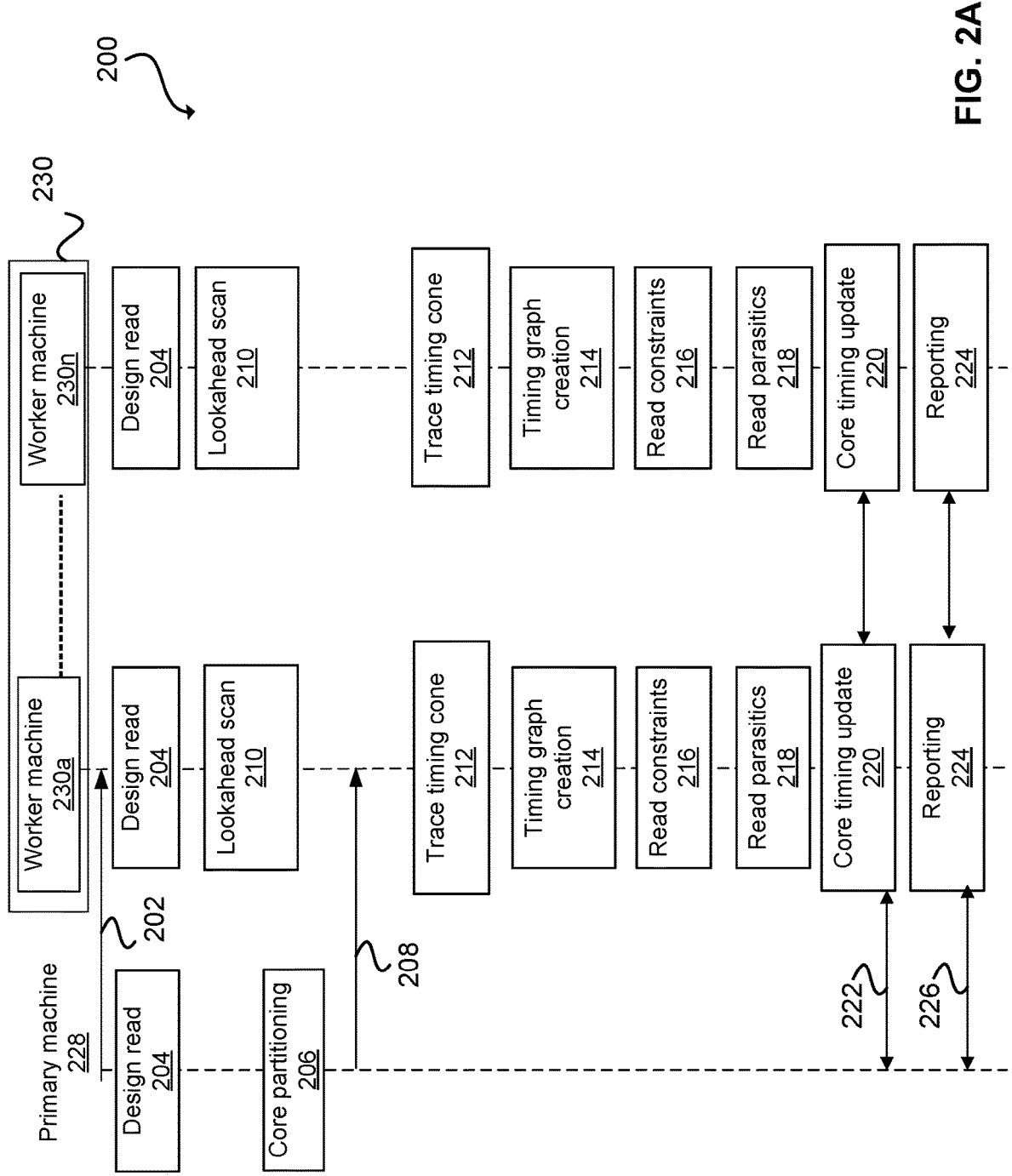
FIG. 2A illustrates a process for STA including a lookahead scan in accordance with an embodiment of the present disclosure.

FIG. 2A illustrates a process 200 for STA flow for a circuit design including a lookahead scan step in accordance with an embodiment of the present disclosure. As described previously herein, process 200 has a faster runtime and smaller memory footprint compared to process 100 of FIG. 1.

At 202, distribution of the workload to each of the worker machines starts. In one embodiment, the distribution can be done after design creation. Neither the timing graph is created, nor any timing constraints is read at that time. In another embodiment, partitioning can be done on a folded netlist even before flattening the design, which is called linking (e.g., linking with technology libraries). The folded netlist may allow a single definition to be represented several times by instances.

At 204, the design is read and linked with technology libraries.

At 206, core partitioning may be performed in primary machine 228 such that each partition may have equal or substantial equal amount of logic compared to other partitions. In this mode, partitioning is performed by the primary machine 228 and the worker machines 230 (230a ... 230n). Thus, partitioning is a shared step performed by the primary machine 228 and the worker machines 230 at 206 and 212, respectively. Then, at 208, the primary machine 228 can communicate partial partition information with the worker machines 230. The partial partition information includes seed endpoints. A seed endpoint may represent a data pin of a storage device or refer to any primary output port of the design. The worker machines 230 complete the partitioning at 212. Each worker machine traces backward to create a logic cone corresponding to their respective partition. This mode further improves balancing across partitions. In one embodiment, hundreds of partitions can be created as the partitioning overhead for communication is negligible.

At 210, a lookahead scan is performed by each of the worker machines. The lookahead scan is further described in FIG. 5. In one implementation, step 210 can be executed in parallel with step 206. The lookahead scan captures data associated with constraints, coupled logic for cross-talk analysis, and clock information. The information obtained by the lookahead scan is extracted and stored. The information obtained by the lookahead scan is used to complete the partitioning at 212. The lookahead scan may be performed on all the file associated with the circuit design or performed as a partial lookahead scan on a portion of files associated with the circuit design as further described in FIG. 5.

Figure 3:
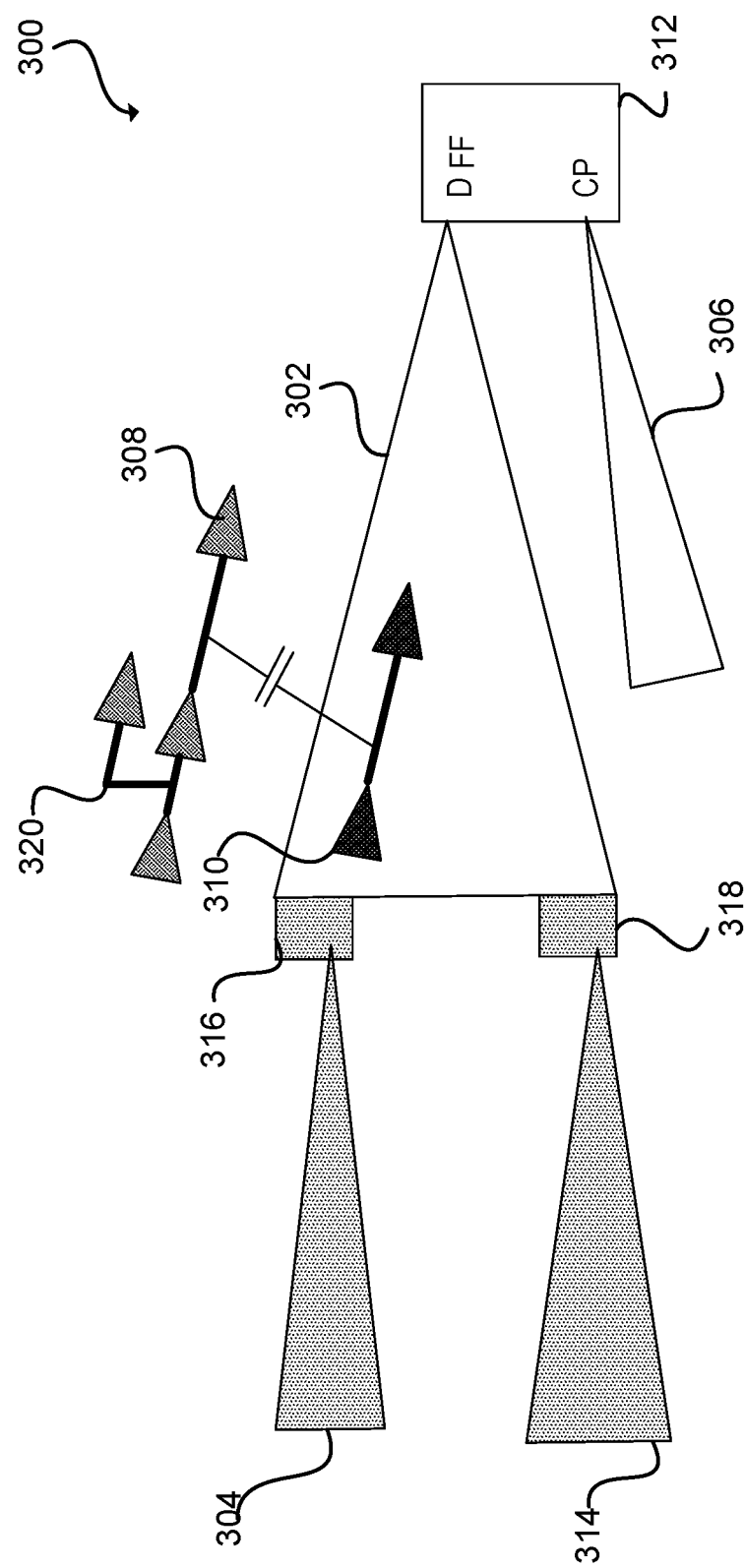
FIG. 3 illustrates a topological cone in accordance with an embodiment of the present disclosure.
Figure 4:
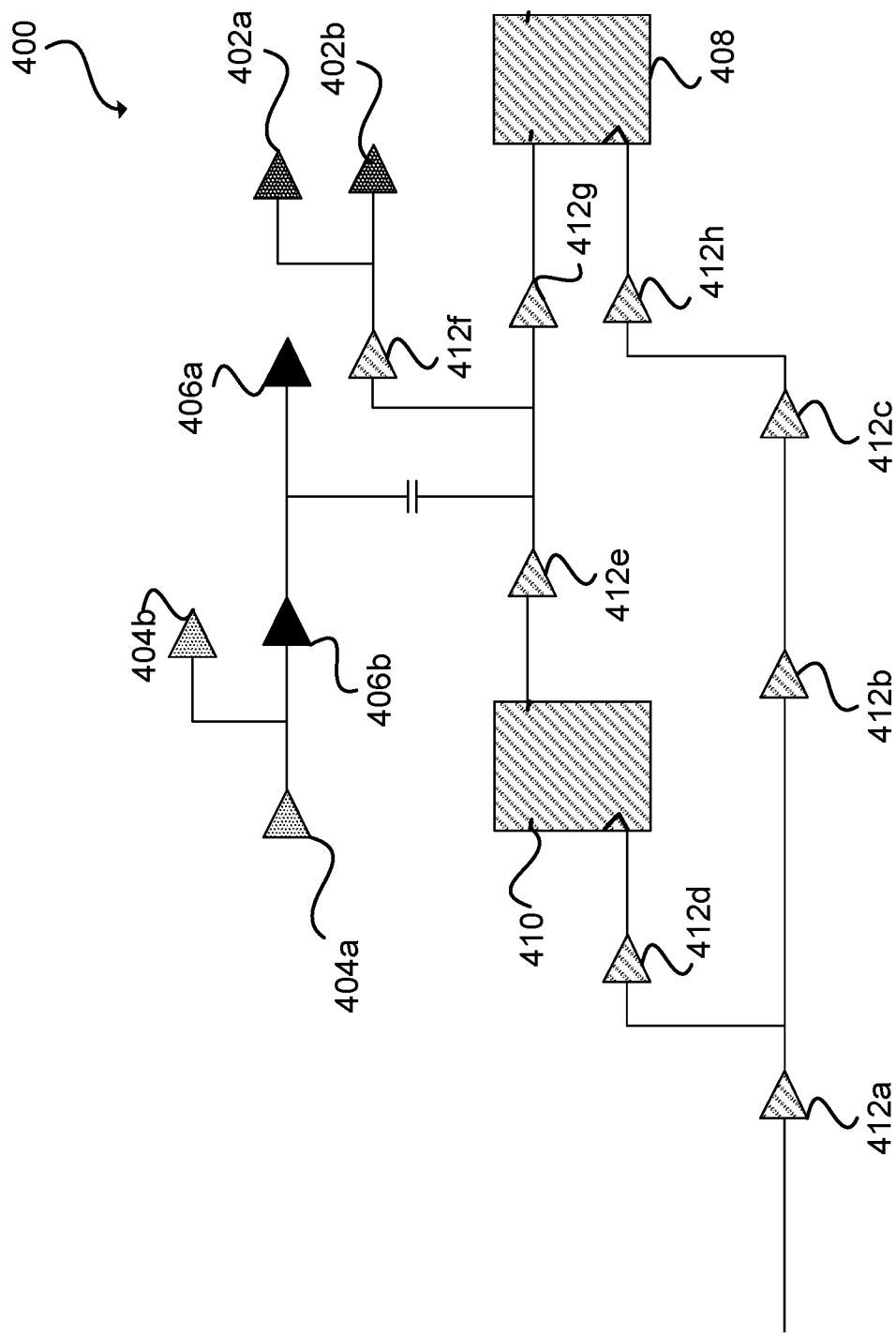
FIG. 4 illustrates augmented logic in accordance with an embodiment of the present disclosure.

Every worker machine has a primary cone of logic. The primary cone is referred to as a topological cone. An exemplary topological cone is shown in FIG. 3. To properly perform STA on the topological cone, additional data from other logics are required. In one embodiment, those data can be obtained from other partitions through communication. But communication across partitions is an expensive process. So, in another embodiment, logic augmentation is performed to reduce inter partition data dependency. An exemplary augmented logic is shown in FIG. 4. The timing for the topological cone is then performed based on the augmentation data.

At 212, each worker machine creates the topological cone on which it performs STA. Extracted information at 210 are used to complete the creation of the topological cone, augmentation, and sub design creation. Once the topological cone and the augmented logic are created, then all other data are deleted. For example, the worker machine 230*a* can create a topological cone associated with its respective partition. Then, the worker machine 230*a* can perform STA on the topological cone.

Figure 2B:
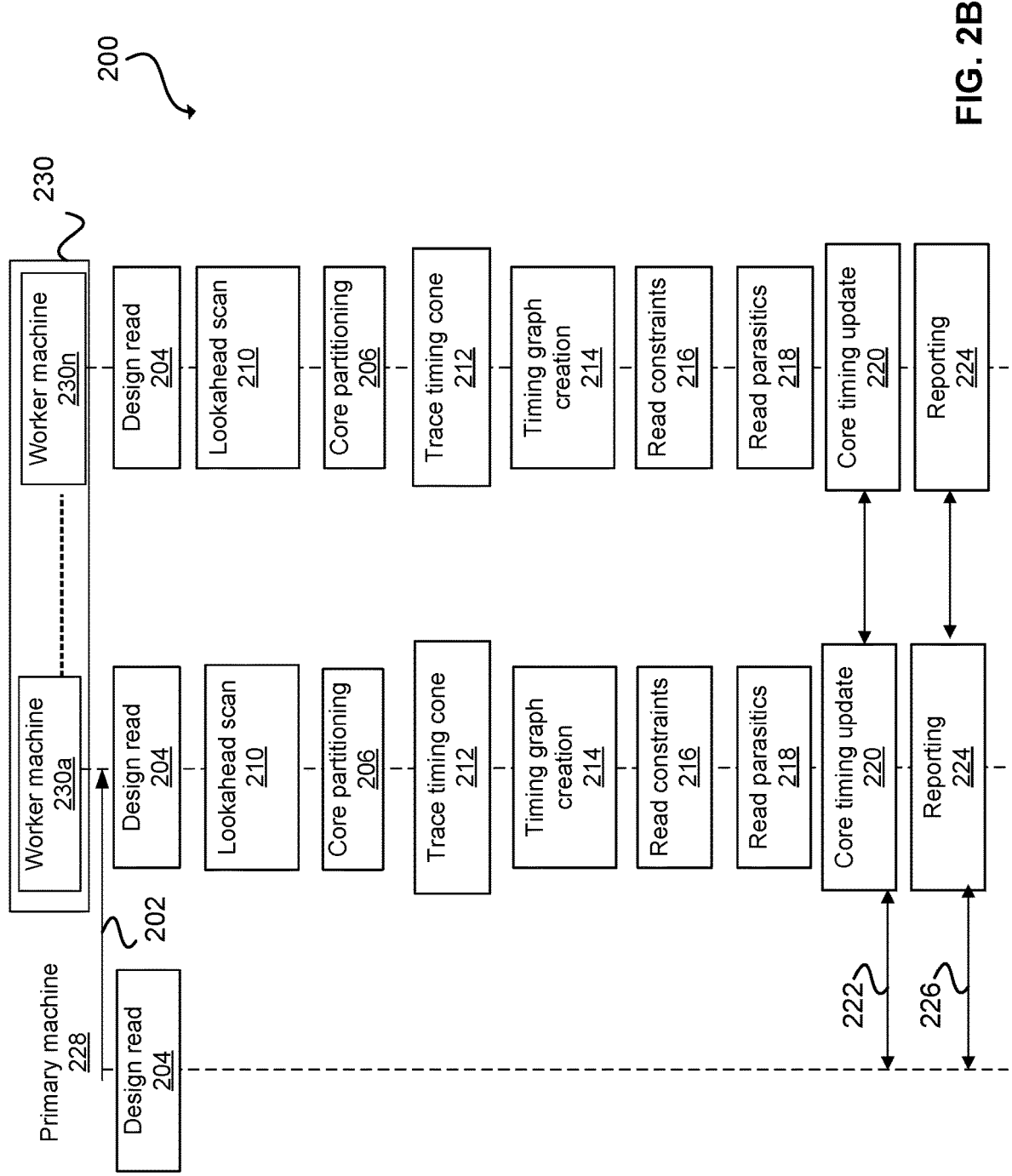
FIG. 2B illustrates a process for STA including a lookahead scan in accordance with another embodiment of the present disclosure.

In some embodiments, core partitioning is performed (i.e., the design is partitioned) by the worker machine at 206 as shown in FIG. 2B. Partitions may be created in a self-aligned way without any communication between a primary machine 228 and worker machines 230 (230*a*, . . . , 230*n*). Every partition knows the complete set of seed endpoints. In the self-aligned mode every partition picks one subset of seed endpoints and creates the partition from them. For most of the large designs this mode gives reasonable balance of logic across partitions.

FIG. 3 illustrates a topological cone 300 in accordance with an embodiment of the present disclosure. The topological cone 300 is the main cone of logic traced by workers. Each timing endpoint may be part of one partition. A timing endpoint may represent a data (D) pin of a storage device or refer to any primary output port of the design. For example, a D pin of a flip-flop 312 may represent a timing endpoint. The topological cone 300 includes a topological data cone 302, one or more topological launch clock cones 304, 314, and a capture clock cone 306 of the set of timing endpoints that is timed by the partition.

The topological data cone 302 may include the logic fanning from the D input of the flip-flop 312. Topological launch clock cones are determined for each sequential cell in the topological data cone 302 in a clock network (back traversal). For example, a first topological launch clock cone 304 for a cell 316 may be determined. A second topological launch clock cone 314 for a cell 318 may be determined. Thus, topological launch clock cones 304, 314 represent the launch clock network for the D-input of the flip-flop 312. In addition, a topological capture clock cone 306 for a clock pin (CP) of the flip-flop 312 is determined by tracing backwards. The topological capture clock cone 306 captures the data on the CP pin of the flip-flop 312.

Additional data representing crosstalk and noise analysis may be used in the timing analysis. The additional data may be included in the topological cone 300. The additional data may include a portion or all of the logic associated with the crosstalk. In some embodiments, the additional data may be communicated to the topological cone 300. In some embodiments, dangling aggressors 308 (also referred to as off-partition aggressor and may also include pre-dangling logic 320) of the first order cross coupled logic associated with topological partitions 310 may be included in the topological cone 300. Dangling aggressors may refer to logic that are not directly or indirectly connected to any topological logic. Aggressors may inject a crosstalk glitch onto a net of the topological cone 300 through one or more coupling capacitors. The crosstalk glitch may impact the timing calculation in the net (e.g., decrease or increase a delay). A first order aggressor may have significant crosstalk on the net. A second order aggressor of the net may affect the first order aggressor (e.g., influence a transition waveform of the first order aggressor). In some aspects, second order aggressors are not kept in the partitions. In some aspects, topological cones (e.g., topological launch clock cone of the cells) of the dangling aggressors 308 may not be included in the topological cone 300.

FIG. 4 illustrates both topological and augmented logic (i.e., any additional logic other than the topological cone that may be required to perform proper STA on the topological part) schematic 400 in accordance with an embodiment of the present disclosure. Augmented logic includes dangling stages, one stage before the dangling stage called pre-dangling stage and an additional stage connected to some topological pin called receiver stage. Receiver stages can be used for proper delay calculation for some topological stages.

In some embodiments, logic 412*e*, 412*f* and 412*g* represent the topological data cone 302 of FIG. 3. The augmented logic (dangling and pre-dangling) is added to the required logic. Register 410 may represent cell 316. Logic 412*d* may represent the topological launch clock cone 304. Logic 412*a*, 412*b*, 412*c*, and 412*h* represent the topological capture clock cone 306 for a flip-flop 408. Logic 406*a* and 406*b* may represent the dangling aggressors 308. In some embodiments, logic 404*a* and 404*b* of the dangling aggressor 406*b* may be included in the design. Logic 404*a* and 404*b* may be referred to as pre-dangling logic. In some embodiments, a first stage of a receiver of the topological data cone 302 may be included (e.g., logic 402*a* and 402*b*) in the topological cone.

In one implementation, instead of keeping all this augmented logic only topological logic is kept in the design. In that case, additional timing data may be communicated from other worker machines instead of performing augmentation. The communicated data may be used to perform proper timing analysis of the topological cone.

Referring to FIG. 2, at 214, an early timing graph representation is created for the reduced design. For example, a timing graph for the partition may be created. This timing graph may further get modified after reading the constraints at 216.

At 216, various STA constraints are read and annotated in for the circuit design associated with the partition. For example, timing and functional constraints may be obtained. At 218, physical information is fed from parasitic files. The physical information may include parameters associated with capacitances and resistances for each net. Both the constraint and parasitics files are for the full design but at the partition, only the portion associated with the reduced design is annotated and rest are discarded.

At 220, core of STA is performed using the constraint and parasitic information read at 216 and 218. Each of the worker performs STA on the topological portion of the design they have. The worker machines 230 and the primary machine 228 communicate multiple times during core timing update at 222 to gather data to obtain an accurate timing. At 222, delays for all circuit elements are determined using the parasitics (read at 218) by propagating them in the timing graph that is created at 214 and checking if timing is met against the constraints that are read in 216.

At 224, various reporting commands are provided to the user. The reporting includes information regarding timing of the design. A portion of the reporting commands may be communicated to the primary machine 228 and/or the worker machines 230 at 226.

It should be understood that some of the above steps of the flow diagram of FIG. 2 can be executed or performed in an order or sequence other than the order shown and described in the figure. Further, some of the above steps may be performed well in advance of other steps, or may be executed or performed substantially simultaneously or in parallel.

Figure 5:
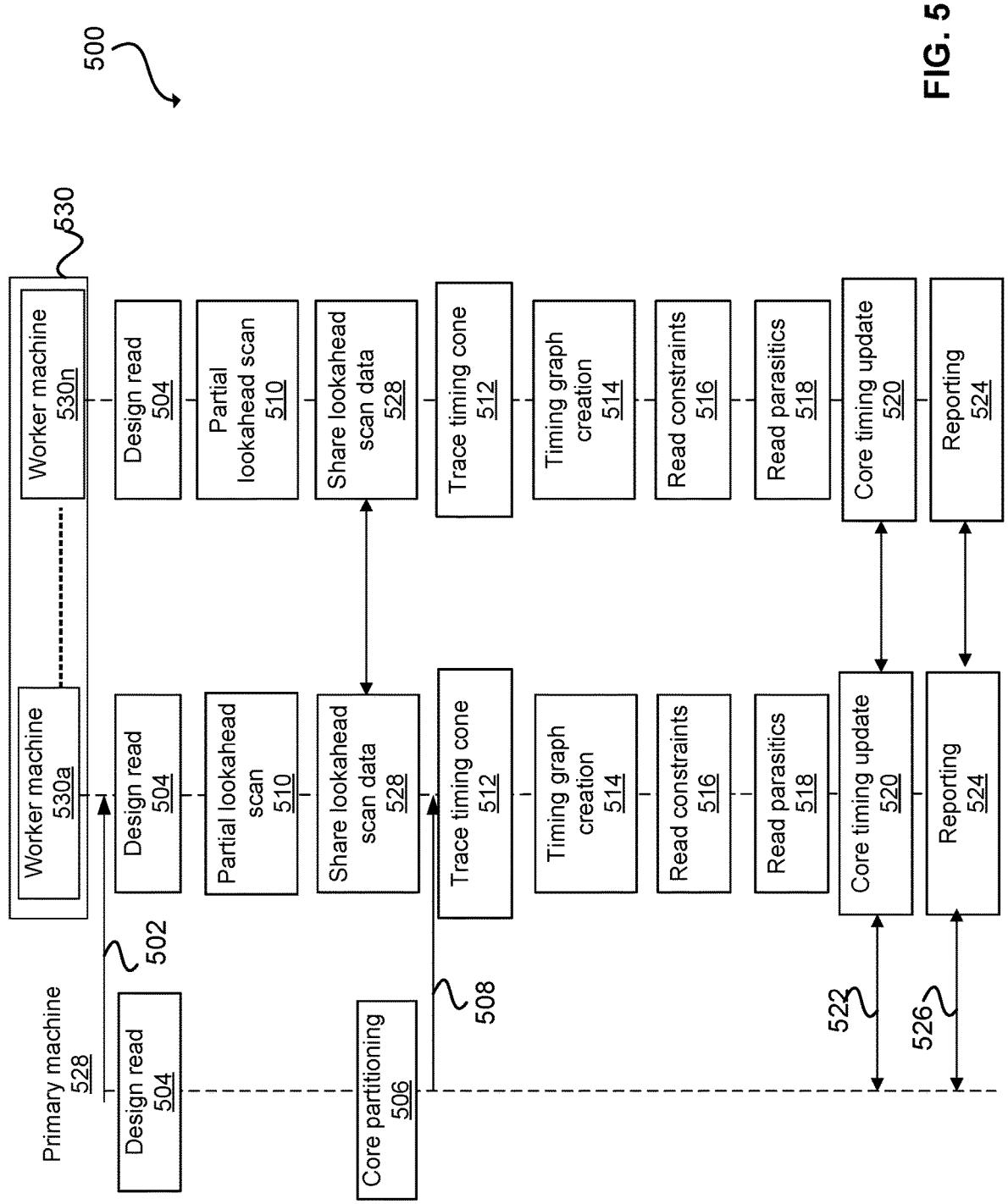
FIG. 5 illustrates a process for STA including a distributed lookahead scan in accordance with an embodiment of the present disclosure.

FIG. 5 illustrates a process 500 for a STA flow including a distributed lookahead scan step to further reduce the overhead in accordance with an embodiment of the present disclosure.

At 502, distribution of workload starts across the workers. In one embodiment, the distribution can be done after design creation. In one embodiment, neither the timing graph is created, nor any timing constraint is read at that time. In another embodiment, partitioning can be done on folded netlist even before flattening the design, which is called linking.

At 504, the design is read and linked with technology libraries.

At 506, core partitioning is performed (i.e., the design is partitioned). Partitions are created in an auto-aligned way with minimum or no communication between a primary machine 528 and worker machines 530 (530a, . . . , 530n). Then, at step 508, the primary machine 528 can communicate partial partition information with the worker machines 530. The partial partition information includes seed endpoints.

At 510, a partial lookahead scan is performed by each of the worker machines 530. The lookahead scan is divided among worker machines 530 and data shared which may improve efficiency for larger design. Each worker machine performs a lookahead scan only on a part of the files (constraints files, parasitics files, design file) associated with the design as opposed to all the files associated with the design as described in lookahead scan 210. The lookahead scan data are shared between worker machines 530 at step 528. For example, in a system using four worker machines, a first worker machine may receive data from the second, third, and fourth worker machines. During the lookahead scan, the parasitic files are identified and parsed to determine knowledge about a coupled network between the worker machines 530 from a portion of the parasitic file. All clocks and generated clock source pins are extracted (e.g., from the topological cone). Clocks are major design objects which need to be consistent across partitions. Constraints that can impact timing, even if not present in the topological cone, are extracted (e.g., external delays, data-to-data checks).

The worker machines 530 complete the partitioning at 512. Each worker machine traces backward to create a logic cone corresponding to their respective partition. This mode further improves balancing across partitions.

At 512, each worker machine 530 creates the topological cone that the respective worker machine 530 will time. Extracted information at 510 and received data at 528 are used to create the topological cone, augmentation, and sub design creation. Once the topological cone and the augmented logic are created, then all other data are deleted.

At 514, an early timing graph representation is created for the reduced design.

At 516, various STA constraints are read in for the reduced design.

At 518, physical information is fed into from parasitic files.

At 520, core timing update is performed. The worker machines 530 and the primary machine 528 may communicate during core timing update at 522 to gather data to obtain an accurate timing.

At 524, various reporting commands are provided to the user. The reporting includes information regarding timing of the design. A portion of the commands may be communicated at 526.

Figure 6:
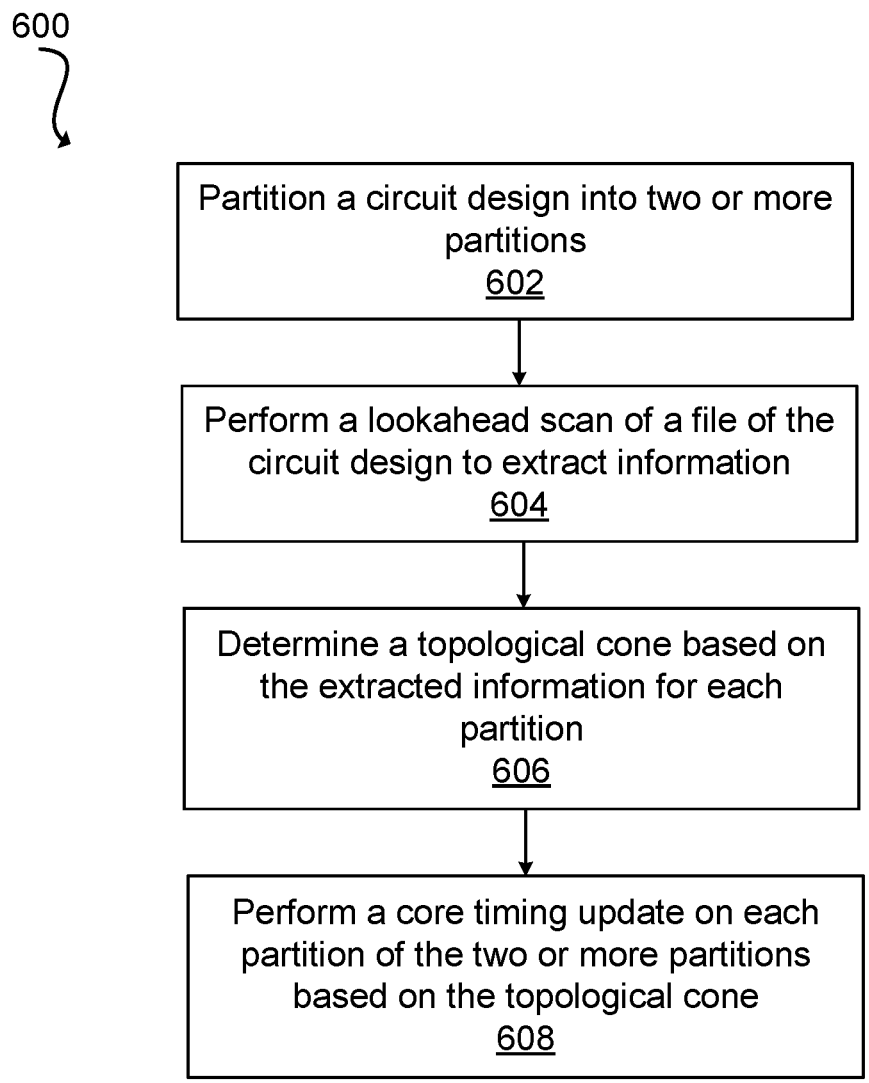
FIG. 6 illustrates a flowchart of a method for STA in accordance with an embodiment of the present disclosure.

FIG. 6 illustrates a flowchart of a method 600 for STA in accordance with an embodiment of the present disclosure.

At 602, a circuit design may be partitioned into two or more partitions.

At 604, a lookahead scan of a file of the circuit design is performed to extract information associated with constraints and clock information. In some embodiments, the lookahead scan may be performed by identifying parasitic files from the file, extracting the clock information, and sharing the extracted information. In some embodiments, each worker machine may perform a partial lookahead scan on a portion of the file. The lookahead scan data can be shared among the worker machines.

At 606, a topological cone is determined based on the extracted information for each partition of the two or more partitions. In some aspects, the topological cone can include objects (clocks, cell, net, storage device) associated with each partition of the two or more partitions.

At 608, a core timing update (timing analysis) is performed on each partition of the two or more partitions based on the topological cone.

It should be understood that some of the above steps of the flow diagram of FIG. 6 can be executed or performed in an order or sequence other than the order shown and described in the figure. Further, some of the above steps may be performed well in advance of other steps, or may be executed or performed substantially simultaneously or in parallel.

The methods and systems described herein provide many improvements. For example, for STA in case of ultra large designs 4-10 times faster timing update than when analyzed flat as a single unit, 2-3 times (primary machine), and 3-6 times (worker machine) smaller than flat memory requirement, and quality of results (QoR) 100% match with flat are obtained.

Figure 7:
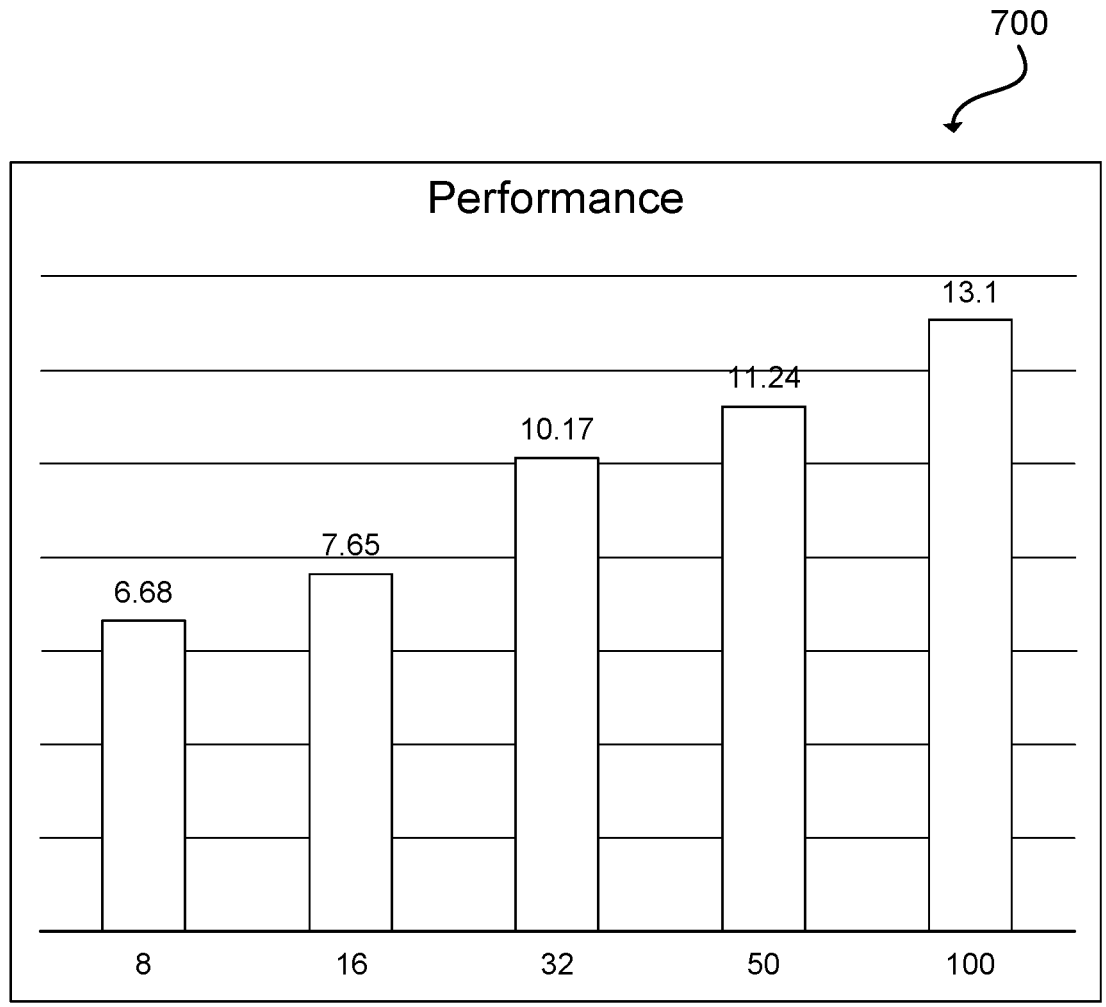
FIG. 7 illustrates exemplary update timing runtime in accordance with an embodiment of the present disclosure.

FIG. 7 illustrates exemplary update timing runtime in accordance with an embodiment of the present disclosure. Chart 700 shows the runtime x factor for timing update for various combination of partitions with respect to flat timing update runtime (i.e., step 112 of FIG. 1 compared to step 220 in FIG. 2). The x-axis corresponds to the number of partitions. The y-axis corresponds the update timing runtime x factor. As shown in chart 700, the runtime x factor scales with increase in worker machines. Chart 700 corresponds to a circuit having 182 M logic gates. The STA for flat is implemented on a processor having 16 cores. The distributed analysis included 1 primary machine (master) and N worker machines, each running with 16 cores. For example, for N=8 the reduction in the update timing is 6.68.

Figure 8:
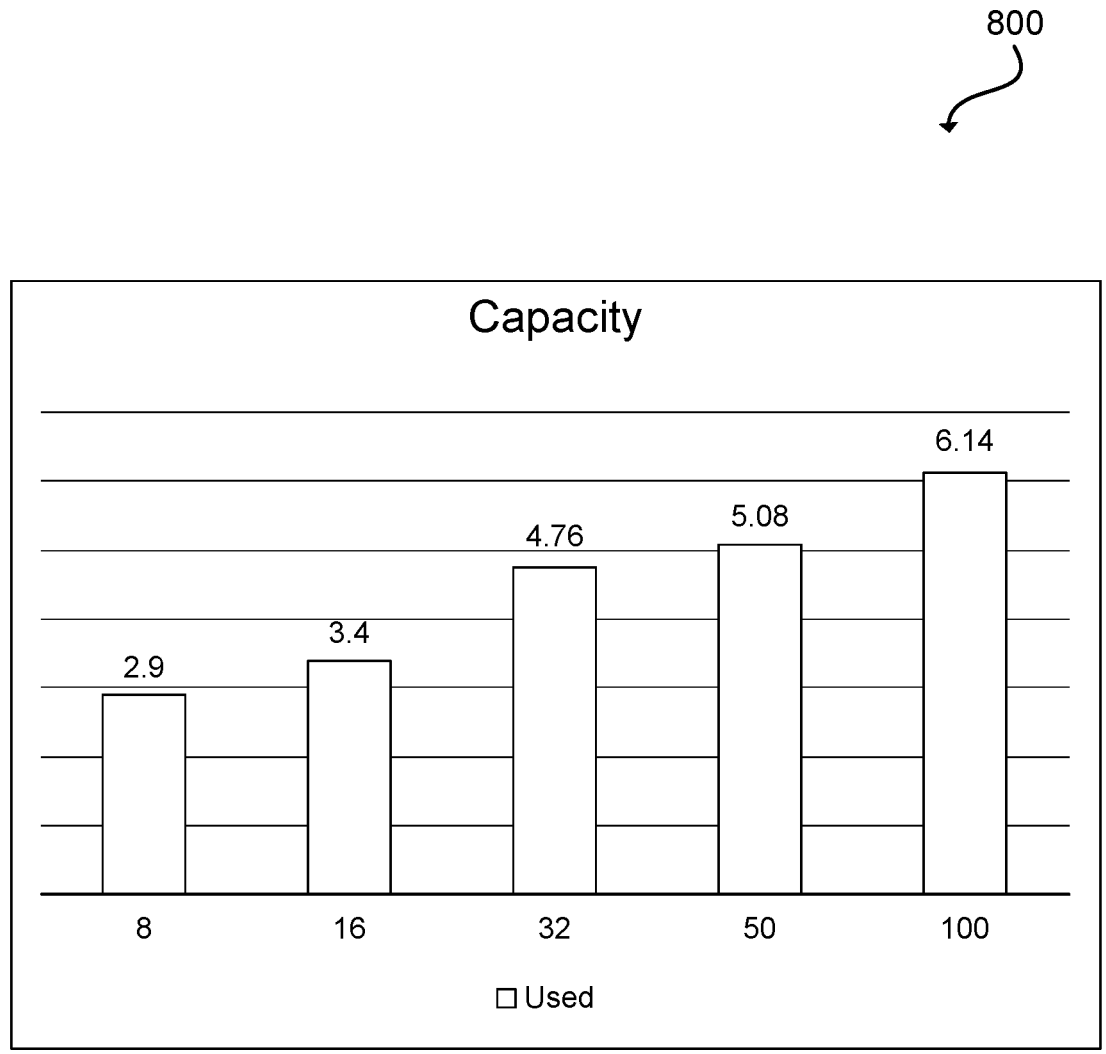
FIG. 8 illustrates exemplary used memory results in accordance with an embodiment of the present disclosure.

FIG. 8 illustrates reduction in memory numbers for the worker machines in accordance with an embodiment of the present disclosure. Chart 800 shows memory reduction x factor of the complete STA flow for the design described in FIG. 7. The x-axis corresponds to the number of partitions. The y-axis corresponds to the full flow used memory reduction x factor.

Figure 9:
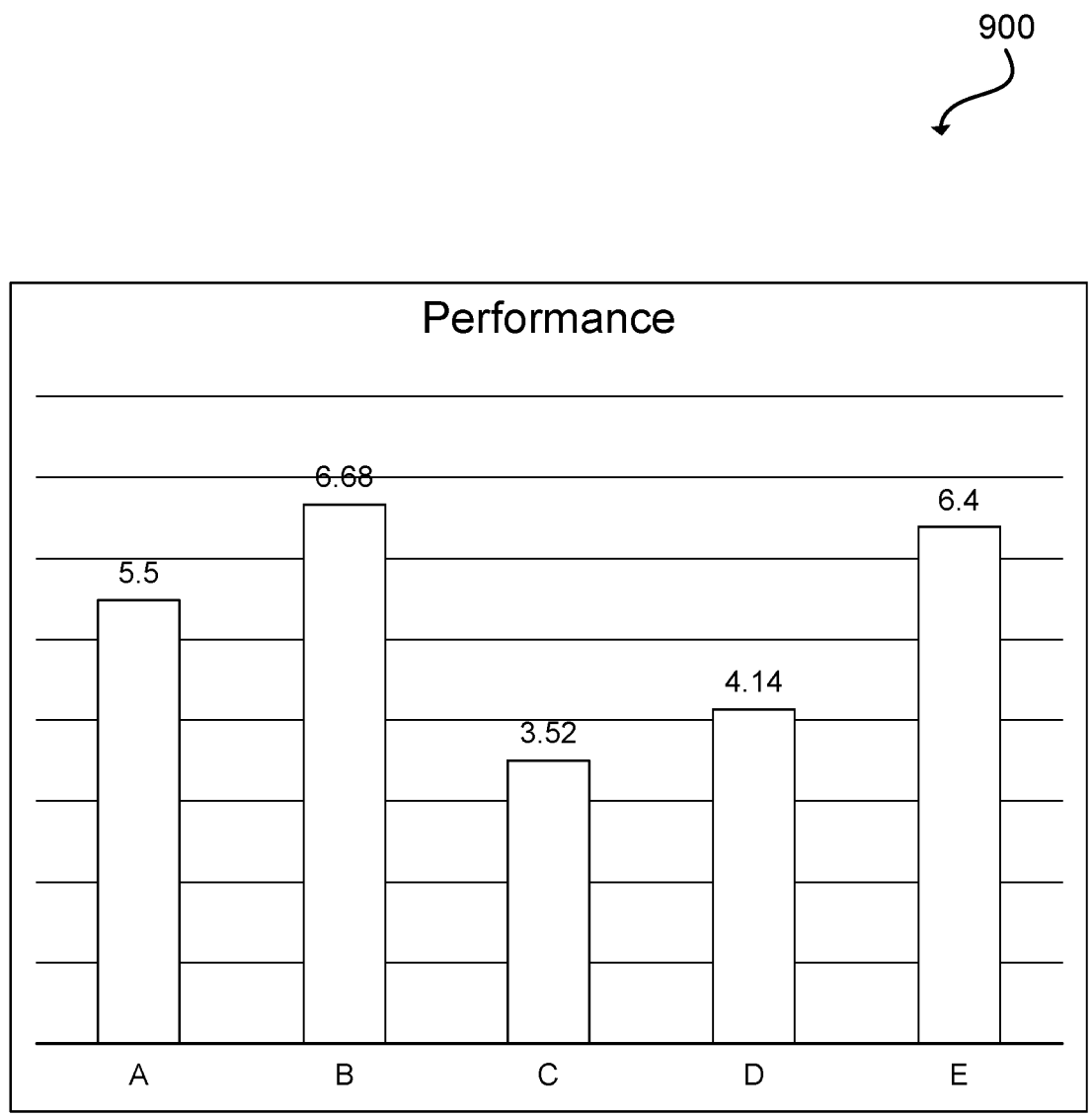
FIG. 9 illustrates exemplary performance results in accordance with an embodiment of the present disclosure.

FIG. 9 illustrates exemplary performance results in accordance with an embodiment of the present disclosure. Graph 900 shows the result of distributed STA run of various designs with different design styles with the approaches described herein. Design A includes 63 M logic gates. Design B includes 182 M logic gates. Design C includes 136 M logic gates. Design D includes 86 M logic gates. Design E includes 404 M logic gates. The flat STA is run on 16 cores. The distributed approach described herein is run on a primary machine and 8 worker machines, each running at 16 cores. The x-axis corresponds to the designs. The y-axis corresponds runtime x factor of step 112 of FIG. 1 compared to step 220 in FIG. 2).

Figure 10:
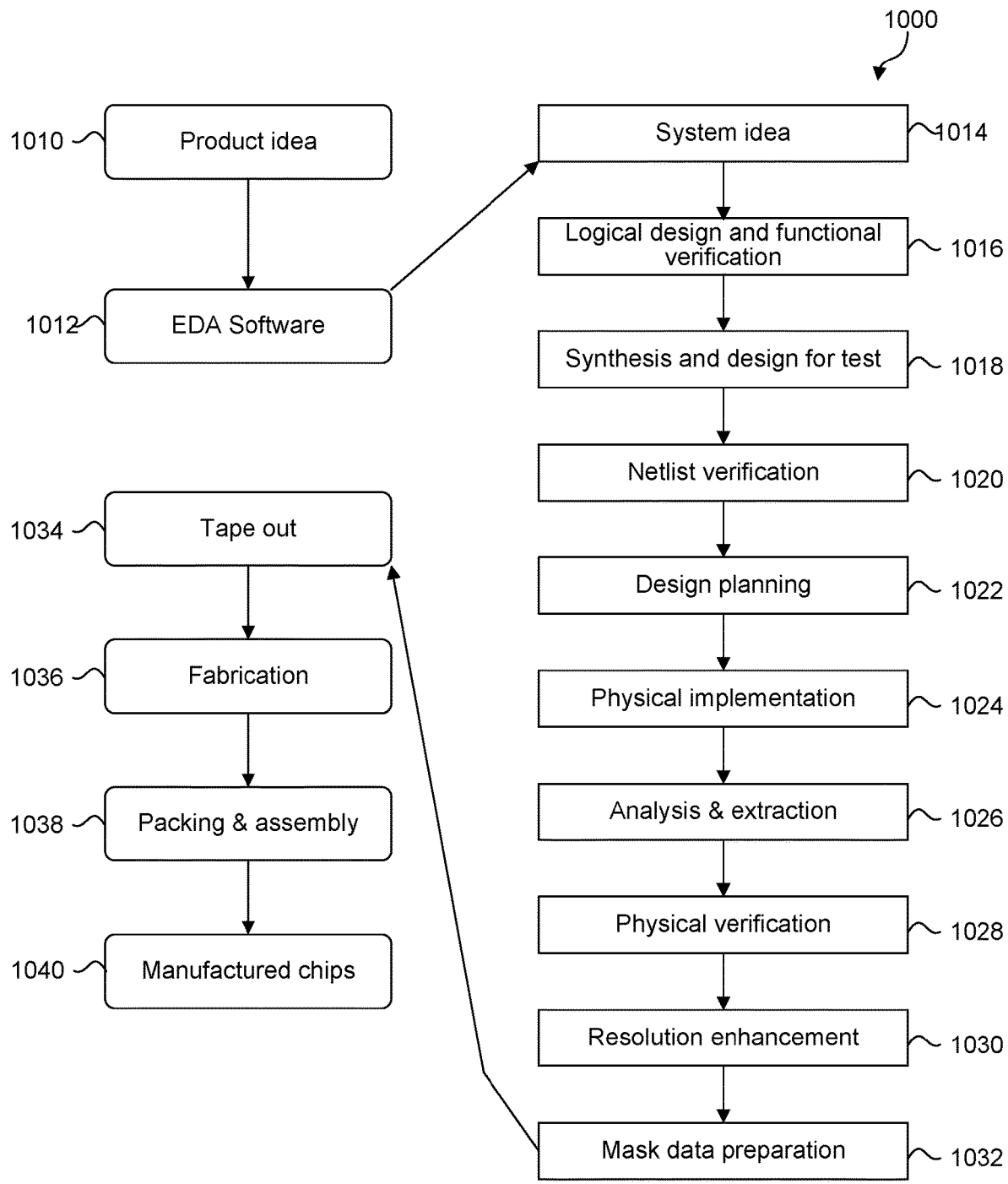
FIG. 10 depicts a flowchart of various processes used during the design and manufacture of an integrated circuit in accordance with some embodiments of the present disclosure.

FIG. 10 illustrates an example set of processes 1000 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1010 with information supplied by a designer, information which is transformed to create an article of manufacture that uses a set of EDA processes 1012. When the design is finalized, the design is taped-out 1034, which is when artwork (e.g., geometric patterns) for the integrated circuit is sent to a fabrication facility to manufacture the mask set, which is then used to manufacture the integrated circuit. After tape-out, a semiconductor die is fabricated 1036 and packaging and assembly processes 1038 are performed to produce the finished integrated circuit 1040.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 10. The processes described can be enabled by EDA products (or tools).

During system design 1014, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1016, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1018, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1020, the netlist is checked for compliance with timing constraints and for correspondence with the HDL code. During design planning 1022, an overall floor plan for the integrated circuit is constructed and analyzed for timing and top-level routing.

During layout or physical implementation 1024, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1026, the circuit function is verified at the layout level, which permits refinement of the layout design. During physical verification 1028, the layout design is checked to ensure that manufacturing constraints are correct, such as DRC constraints, electrical constraints, lithographic constraints, and that circuitry function matches the HDL design specification. During resolution enhancement 1030, the geometry of the layout is transformed to improve how the circuit design is manufactured.

During tape-out, data is created to be used (after lithographic enhancements are applied if appropriate) for production of lithography masks. During mask data preparation 1032, the 'tape-out' data is used to produce lithography masks that are used to produce finished integrated circuits.

A storage subsystem of a computer system (such as computer system 1100 of FIG. 11) may be used to store the programs and data structures that are used by some or all of the EDA products described herein, and products used for development of cells for the library and for physical and logical design that use the library.

Figure 11:
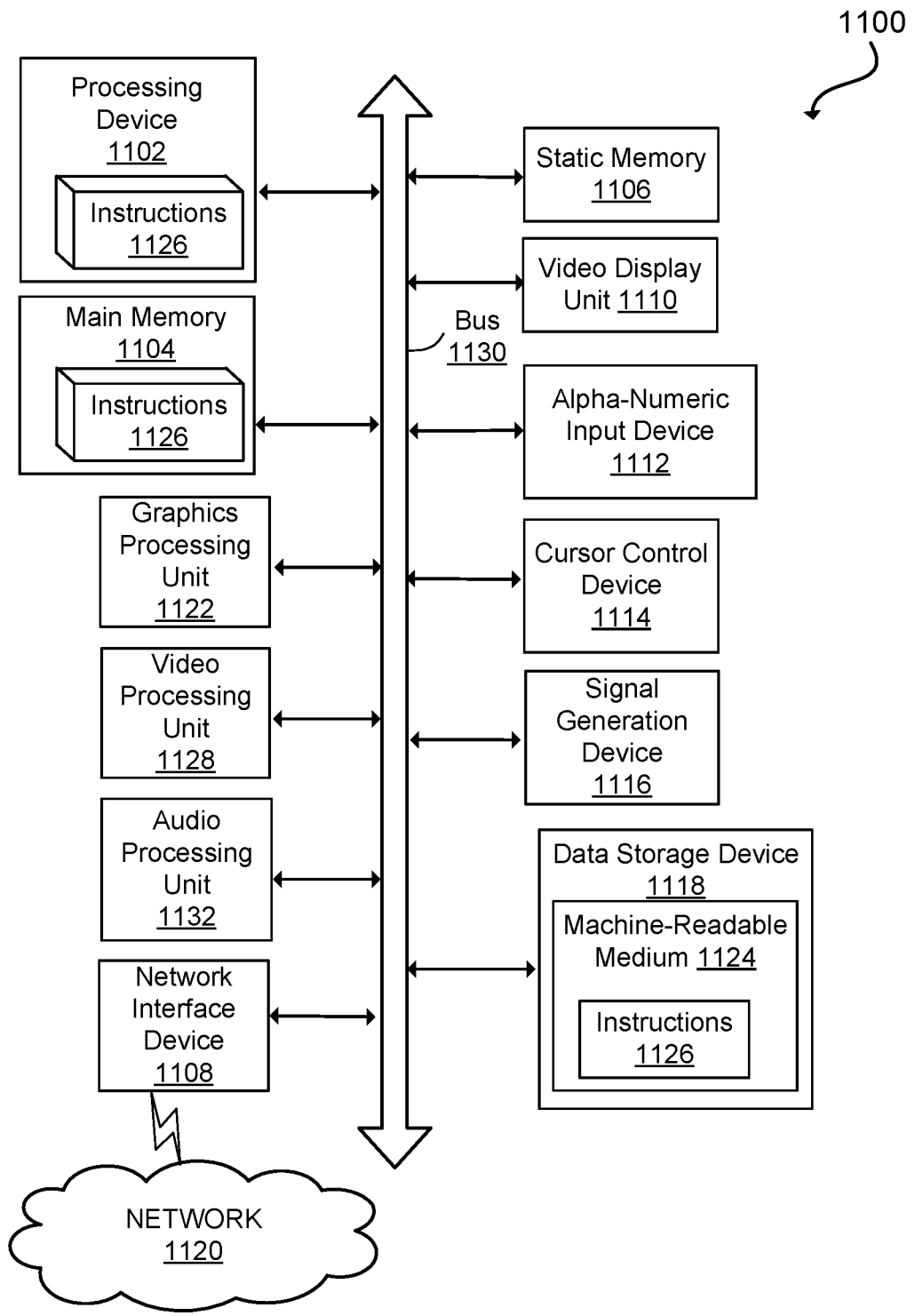
FIG. 11 depicts a diagram of an example computer system in which embodiments of the present disclosure may operate.

FIG. 11 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM), a static memory 1106 (e.g., flash memory, static random access memory (SRAM), etc.), and a data storage device 1118, which communicate with each other via a bus 1130.

Processing device 1102 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 may be configured to execute instructions 1126 for performing the operations and steps described herein.

The computer system 1100 may further include a network interface device 1108 to communicate over the network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a non-transitory computer-readable medium) on which is stored one or more sets of instructions 1126 or software embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

In some implementations, the instructions 1126 include instructions to implement functionality corresponding to the present disclosure. While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1102 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

The invention claimed is:

1. A method for static timing analysis, the method comprising:
   extracting information associated with constraints and clock information from a file of a circuit design;
   scanning the circuit design for timing constraints simultaneously with partitioning the circuit design, wherein the partitioning includes overlapping partitions based on a structure of the circuit design;
   determining, by at least one computer processor, a topological cone based on the extracted information for a partition of two or more partitions of the circuit design, the topological cone including objects associated with the partition of the two or more partitions of the circuit design; and
   performing timing analysis on the partition of the two or more partitions based on the topological cone.

2. The method of claim 1, further comprising:
   associating a global identification and a local identification with an object included in multiple partitions.

3. The method of claim 2, further comprising:
   associating the object with a primary partition; and
   assigning the global identification to the object based on a sorting by names of objects of the circuit design.

4. The method of claim 1, wherein the extracting comprises performing a partial lookahead scan comprising:
   extracting one or more of the clock information, the constraints, or parasitics from a portion of the file; and
   sharing with at least another computer processor the extracted information.

5. The method of claim 1, wherein the extracting comprises performing a lookahead scan comprising:
   extracting the constraints and parasitics from the file.

6. The method of claim 1, further comprising linking the circuit design to technology libraries after or before partitioning the circuit design.

7. The method of claim 1, wherein the topological cone includes logic associated with clocking each sequential cell, logic fanning from an input of an object, and logic associated with data captured at a clock pin of the object.

8. The method of claim 1, wherein determining the topological cone comprises:
   adding one or more dangling stage logic and pre-dangling stage logic, wherein dangling stage logic are aggressors at a first stage and pre-dangling stage logic are aggressors of a second stage before the first stage.

9. The method of claim 1, further comprising:
   receiving from at least another computer processor data associated with the timing analysis of another partition of the two or more partitions while performing the timing analysis.

10. The method of claim 1, further comprising:
    timing the topological cone based on data received from another partition of the two or more partitions.

11. The method of claim 1, further comprising:
    performing logic augmentation on the circuit design to obtain augmentation data for the partition; and
    timing the topological cone based on the augmentation data.

12. A system comprising:
    a memory storing instructions; and
    a processor, coupled with the memory and to execute the instructions, the instructions when executed cause the processor to:
    extract information associated with constraints and clock information from a file of a circuit design based on performing a lookahead scan comprising extracting one or more of the constraints and parasitics from the file,
    determine a topological cone based on the extracted information for a partition of two or more partitions of the circuit design, the topological cone including objects associated with the partition,
    associate a global identification and a local identification with an object included in multiple partitions,
    associate the object with a primary partition,
    assign the global identification to the object based on a sorting by names of objects of the circuit design, and
    perform timing analysis on the partition based on the topological cone.

13. The system of claim 12, wherein the processor is further configured to:
    associate a global identification and a local identification with an object included in multiple partitions.

14. The system of claim 12, wherein the instructions to extract information comprise instructions to perform a partial lookahead scan comprising instructions, when executed, configure the processor to:
    extract one or more of the clock information, the constraints, and parasitics from a portion of the file; and
    share with at least another computer processor the extracted information.

15. The system of claim 12, wherein the topological cone includes logic associated with clocking each sequential cell, logic fanning from an input of an object, and logic associated with data captured at a clock pin of the object.

16. The system of claim 12, wherein the processor is further configured to:
    time the topological cone based on data received from another partition of the two or more partitions.

17. The system of claim 12, wherein the processor is further configured to:
    perform logic augmentation on the circuit design to obtain augmentation data for the partition; and
    time the topological cone based on the augmentation data.

18. A method for static timing analysis, the method comprising:
- extracting information associated with constraints and clock information from a file of a circuit design;
- determining, by at least one computer processor, a topological cone based on the extracted information for a partition of two or more partitions of the circuit design, the topological cone including objects associated with the partition of the two or more partitions of the circuit design, wherein determining the topological cone comprises:
  - adding one or more dangling stage logic and pre-dangling stage logic, wherein dangling stage logic are aggressors at a first stage and pre-dangling stage logic are aggressors of a second stage before the first stage; and
- performing timing analysis on the partition of the two or more partitions based on the topological cone.

19. The method of claim 18, further comprising:
- associating a global identification and a local identification with an object included in multiple partitions;
- associating the object with a primary partition; and
- assigning the global identification to the object based on a sorting by names of objects of the circuit design.

20. The method of claim 18, wherein the extracting comprises performing a lookahead scan comprising:
- extracting the constraints and parasitics from the file.

21. The method of claim 18, wherein the extracting comprises performing a partial lookahead scan comprising:
- extracting one or more of the clock information, the constraints, or parasitics from a portion of the file; and
- sharing with at least another computer processor the extracted information.

* * * * *